US008181551B2

(12) United States Patent
Breu et al.

(10) Patent No.: US 8,181,551 B2
(45) Date of Patent: May 22, 2012

(54) DEVICE FOR DISPLACING AND POSITIONING AN OBJECT IN SPACE AND WHICH CAN DETECT THE DECOUPLING OF A JOINT OF A PARALLELOGRAM ROD ASSEMBLY

(75) Inventors: Michael Breu, Luechingen (CH); Juergen Renner, Blumberg (DE); Harry Rutschmann, Klettgau-Griessen (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 12/524,625

(22) PCT Filed: Jan. 3, 2008

(86) PCT No.: PCT/EP2008/050029
§ 371 (c)(1),
(2), (4) Date: Jul. 27, 2009

(87) PCT Pub. No.: WO2008/092710
PCT Pub. Date: Aug. 7, 2008

(65) Prior Publication Data
US 2010/0101359 A1    Apr. 29, 2010

(30) Foreign Application Priority Data
Jan. 29, 2007 (DE) .................. 10 2007 004 166

(51) Int. Cl.
*B25J 13/02* (2006.01)
(52) U.S. Cl. .................................. 74/490.01
(58) Field of Classification Search ............ 901/2, 9, 901/14–18, 27–29; 414/375; 700/245; 318/567; 74/490.01, 490.03, 490.05
See application file for complete search history.

(56) References Cited

U.S. PATENT DOCUMENTS

| 4,503,416 A | * | 3/1985 | Kim ............................. 338/99 |
| 4,639,184 A | * | 1/1987 | Knasel et al. ................ 414/730 |
| 4,976,582 A | * | 12/1990 | Clavel .......................... 414/729 |
| 5,333,514 A | * | 8/1994 | Toyama et al. ........... 74/490.06 |

(Continued)

FOREIGN PATENT DOCUMENTS

DE    260889 A1    10/1988
(Continued)

*Primary Examiner* — James Pilkington
*Assistant Examiner* — Matthew R Vaerewyck
(74) *Attorney, Agent, or Firm* — Ronald E. Greigg

(57) ABSTRACT

The invention relates to a device for displacing and positioning an object in a space, having at least three actuating arms that can pivot about a transmission axis. Each arm is connected to a motor unit/transmission unit. A carrier element is provided in order to arrange at least one gripping element for gripping the object. Each actuating arm, on the free ends thereof, has a first articulated axis that is parallel to the transmission axis with first articulated parts arranged at a distance from each other, of a first ball joint. The carrier element has a second articulated axis associated with each actuating arm with first articulated parts that are arranged at a distance in relation to each other, of a second ball joint. The first articulated axis is connected to the second articulated axis by a pair of connecting bars which include terminal second articulated parts. The terminal second articulated parts of the connecting bars form the first and second ball joints with the first articulated parts on the first articulated axis and the first articulated parts on the second articulated axis. The connecting bars for stabilizing the ball joints are connected together. The actuating arms, the connecting bars, the articulated parts of the ball joint and the carrier element form electrically conductive parts of an alarm circuit.

20 Claims, 2 Drawing Sheets

U.S. PATENT DOCUMENTS

| | | | |
|---|---|---|---|
| 5,348,777 A * | 9/1994 | Oonuki et al. | 428/34.5 |
| 5,397,212 A * | 3/1995 | Watanabe et al. | 414/744.6 |
| 5,807,408 A * | 9/1998 | Ruiz | 318/446 |
| 5,885,052 A * | 3/1999 | Tsuji et al. | 414/744.6 |
| 5,903,123 A * | 5/1999 | Shimogama | 318/568.13 |
| 6,433,681 B1 * | 8/2002 | Foo et al. | 340/440 |
| 6,516,681 B1 * | 2/2003 | Pierrot et al. | 74/490.01 |
| 6,543,987 B2 * | 4/2003 | Ehrat | 414/735 |
| 7,395,136 B2 * | 7/2008 | Osten | 700/258 |
| 7,478,576 B2 * | 1/2009 | Rosheim | 74/490.06 |
| 2003/0064816 A1 * | 4/2003 | Schuler | 464/102 |
| 2004/0143876 A1 * | 7/2004 | Persson et al. | 901/1 |
| 2004/0146388 A1 * | 7/2004 | Khajepour et al. | 414/680 |
| 2005/0177279 A1 | 8/2005 | Osten | |
| 2006/0182602 A1 * | 8/2006 | Schuler et al. | 414/735 |
| 2006/0210386 A1 * | 9/2006 | Neutel | 414/744.3 |
| 2007/0089557 A1 * | 4/2007 | Solomon et al. | 74/490.01 |
| 2007/0113699 A1 * | 5/2007 | Khajepour et al. | 74/490.03 |
| 2008/0235970 A1 * | 10/2008 | Crampton | 33/503 |
| 2010/0101359 A1 * | 4/2010 | Breu et al. | 74/490.06 |
| 2011/0088760 A1 * | 4/2011 | Sheng et al. | 136/255 |

FOREIGN PATENT DOCUMENTS

| | | |
|---|---|---|
| EP | 0194022 A1 | 9/1986 |
| EP | 1543915 A1 | 6/2005 |
| JP | 2000024983 A * | 1/2000 |
| WO | 0206017 A1 | 1/2002 |
| WO | 03106114 A1 | 12/2003 |

* cited by examiner

DEVICE FOR DISPLACING AND POSITIONING AN OBJECT IN SPACE AND WHICH CAN DETECT THE DECOUPLING OF A JOINT OF A PARALLELOGRAM ROD ASSEMBLY

CROSS-REFERENCE TO RELATED APPLICATION

This application is a 35 USC 371 application of PCT/EP 2008/050029 filed on 3 Jan. 2008.

BACKGROUND OF THE INVENTION

1. Field of the Invention

The invention relates to a device for moving and positioning an object in space, having at least three actuating arms that are each connected to a motor/transmission unit and are pivotable around a transmission axis, a support element provided for arranging at least one gripping mechanism for gripping the object; at its free end, each actuating arm has a first articulation axis extending parallel to the transmission axis, with first joint parts spaced apart from each other, each belonging to a respective first ball joint; the support element has a second articulation axis associated with each actuating arm, with first joint parts spaced apart from each other, each belonging to a respective second ball joint; the first articulation axis is connected to the second articulation axis by means of a pair of connecting rods that have second joint parts at the ends and, together with the first joint parts on the first articulation axis and the first joint parts on the second articulation axis, these second joint parts at the ends of the connecting rods form the first and second ball joints; and the connecting rods are connected to each other in order to stabilize the ball joints. The device for moving and positioning an object in space is a device referred to in professional circles as a robot with parallel kinematics.

2. Description of the Prior Art

A device with three parallelogram rod assemblies of the type mentioned at the beginning, which is also referred to as a "delta robot," is known from WO-A-03/106114. The two connecting rods composed of a stiff material and belonging to a parallelogram rod assembly have pairs of pins that protrude laterally in the region of the bail joints. Pairs of O-rings composed of a rubber-elastic material are elastically stretched into place around the pins on opposite sides of the connecting rods. The prestressing force produced between the two connecting rods holds the sockets against the balls. The prestressing also provides the required restoring moment that prevents the rods from twisting due to friction, dynamic forces, and forces exerted by components mounted on the rods such as vacuum hoses. In lieu of rubber-elastic O-rings, U.S. Pat. No. 6,419,211 has disclosed non-paired spring elements that have two angled elements with compression springs situated between them.

In the event of an overload, i.e. when the loads on the joints become greater than the prestressing forces, the joints decouple, which is a desired safety function and prevents the destruction of the robot.

It is disadvantageous that this decoupling is not detected. Consequently, even when one parallelogram rod assembly has already decoupled, the actuating arms of the delta robot continue to move, which leads to uncontrolled movements of the robot. The remaining connecting rod pairs or the support element can be hurled outward in an uncontrolled fashion and may possibly be damaged. Since the system itself does not discover that the robot is no longer functional, the system continues to run without taking suitable steps, e.g. stopping the entire system or having production taken over by the remaining robots.

It is therefore desirable for a decoupling of a joint to be immediately detected.

In a design known from US 2005/0177279, an acceleration sensor mounted on the support element detects a tilting of the support element caused by the decoupling of the connecting rods. This design is comparatively expensive and requires a set of electronics on the support element, thus increasing its weight. The required cables and the cable breakage due to the high cycle number of the delta robot of 200 cycles/minute represent an additional problem in terms of service life. The cables can be damaged when the decoupling occurs and also prevent the robot from being disassembled.

There have already been attempts to use the dynamic properties of the robot or the drive moments and power consumption of the motors as a basis for drawing conclusions about the completeness of the robot structure. But since these parameters are also changed by the load of the robot at the gripper, it is not easy to implement such designs.

U.S. Pat. No. 6,516,681 has disclosed a robot with parallel kinematics that has four parallelogram rod assemblies.

OBJECT AND SUMMARY OF THE INVENTION

The object of the invention is to equip a device of the type mentioned at the beginning with the ability to permit simple, immediate detection of the decoupling of a joint of a parallelogram rod assembly.

The object is attained according to the invention in that the actuating arms, which are electrically insulated in relation to one another, the connecting rods, the joint parts of the ball joints, and the support element, also referred to as the tool support or platform, constitute electrically conductive or signal line-equipped components of a monitoring circuit.

The electric insulation of the three actuating arms can be provided through insulation in relation to the motors or through insulation of the motors or transmissions in relation to the base element of the robot.

The signal is introduced via the actuating arms, joints, and connecting rods directly to the support element and is correspondingly conducted back in the other parallelogram rod assemblies; these elements, as mentioned above, are themselves conductive or are equipped with corresponding signal lines.

The actuating arms and parallelogram rod assemblies of the robot therefore close a monitoring/signal circuit. To this end, a monitoring signal is introduced into an actuating arm and is conveyed back via either one or both of the other actuating arms. In this instance, the signal can be conveyed directly via the ball joints and rods and then transmitted via the support element to the discharging connecting rods.

The signal can be separated out from the machine ground through suitable filtering, e.g. in the form of a high-frequency signal passing through a low-pass/high-pass filter, so that the signal-conveying components can continue to be connected to ground, for example, via a low-pass filter in order to prevent an electrostatic charging and assure machine safety.

In a first embodiment according to the invention, the monitoring circuit extends from one actuating arm via the connecting rods, the joint parts of the ball joints, and the support element to the two other actuating arms; the support element is composed of an electrically conductive material.

In a second device according to the invention, the monitoring circuit extends from one actuating arm via the connecting rods, the joint parts of the ball joints, and the support element to the two other actuating arms; the support element is composed of an electrically non-conductive material and at least two of the adjacent joint parts of the ball joints of adjacent parallelogram rod assemblies are connected to each other via an electrical conductor. Depending on the wiring provided, therefore, the support element, which is also referred to as the tool support, can be embodied, for example, as electrically conductive or as electrically insulating, with a corresponding galvanic connection between the corresponding joint balls.

The connecting rods are preferably composed of a material with integrated electrically conductive components or substances, e.g. a carbon fiber material. The associated second joint parts preferably contain electrically conductive components and the first joint parts are likewise composed of an electrically conductive base material such as an aluminum alloy with a tribologically favorable surface treatment, or of electrically conductive ceramics such as SiSiC or $Al_2O_3$—TiN.

The currently used carbon fiber rods, actuating arms, and socket-equipped end pieces, which are mounted onto the carbon fiber rods and composed of a graphite-containing plastic, are already sufficiently conductive to be able to transmit a monitoring signal.

The ceramic joint balls that are currently standard can, for example, be replaced by a non-oxide ceramic which likewise has a sufficient conductivity. The support element, which is also referred to as a platform, can itself be embodied as electrically conductive or the joint balls can be connected to each other by means of an electrical conductor. The requirements for a signal circuit are thus fulfilled. It is only necessary for the actuating arms to be insulated in relation to the ground of the robot so that the signal cannot circulate directly between the actuating arms, but must instead be conducted via the connecting rods and the platform.

If the measurement signal lies in a corresponding frequency range, then the insulation can also take place by means of a low-pass filter situated between the actuating arms and ground so that the mechanism is still connected to ground and cannot become charged, e.g. electrostatically, due to the friction generated by the movement.

The signal can be supplied to the actuating arms via sliding rings or sliding heads in a fashion similar to that of the ball joints or it can be simultaneously connected to the motor ground and introduced into the actuating arms directly via the shafts of the drive units. In this case, the ground must be separated out with a separate low-pass filter provided before each of the motors.

If the signal drops out in both of the discharging actuating arms, then the robot must have become decoupled in the supplying actuating arm. If the signal drops out in only one of the discharging actuating arms, then the corresponding parallelogram has become decoupled. It is thus possible, based on the presence of the two discharging signals, to conclude whether a leg pair—and which one—has become decoupled and to initiate an immediate stopping of the robot. This prevents the robot from moving further and causing a decoupling of additional leg pairs or complete loss of the platform. A corresponding malfunction message can be sent to the system control unit and the system can be switched into a suitable operating state.

In one variant of the second device according to the invention, the monitoring circuit extends from a first actuating arm via one or both connecting rods of the parallelogram rod assembly, down to the support element and, via the one connecting rod of an adjacent parallelogram rod assembly, up to a second actuating arm, via the other connecting rod back to the support element again, and, via the one connecting rod of the adjacent parallelogram rod assembly, back up to the third actuating arm. This embodiment requires only one discharge of the monitoring current, with a correspondingly simpler wiring. On the other hand, the absence of the signal does not give any indication as to which of the leg pairs has become decoupled.

By comparison with the known systems for monitoring the operating state of the parallelogram rod assembly of a delta robot, the arrangement of a monitoring circuit according to the invention offers the following advantages:

Reliable detection of a decoupled connecting rod or parallelogram rod assembly.

Increased operational safety, lower risk of damage to the robot or system or of injury to operating personnel.

Clear malfunction detection through identification of the parallelogram rod assembly.

Simple, reliable, and very favorable design: no additional malfunction-prone moving cables or sensors required.

No additional cables that would prevent disassembly or decoupling of the parallelogram rod assembly or would become damaged due to same.

The prestressing of the joints reliably produces the necessary contact in the joint sockets and, due to the continuous motion in the form a sliding friction and the resulting definite wear on the contact pairs without a depositing of impurities, oxide buildup, or the like, these contact pairs maintain a favorable level of electrical conductivity, thus practically eliminating the occurrence of false alarms.

Most currently available components are already suitable for closing the required signal circuit. With the use of electrically conductive connecting rods composed of a carbon fiber material, it is only necessary to replace the corresponding joint parts with a conductive ceramic and to insulate the actuating arms from the common ground, preferably via a low-pass filter.

BRIEF DESCRIPTION OF THE DRAWINGS

Other advantages, defining characteristics, and details of the invention ensue from the following description of preferred exemplary embodiments and the drawings, in which.

DESCRIPTION OF THE PREFERRED EMBODIMENTS

Figure 1:
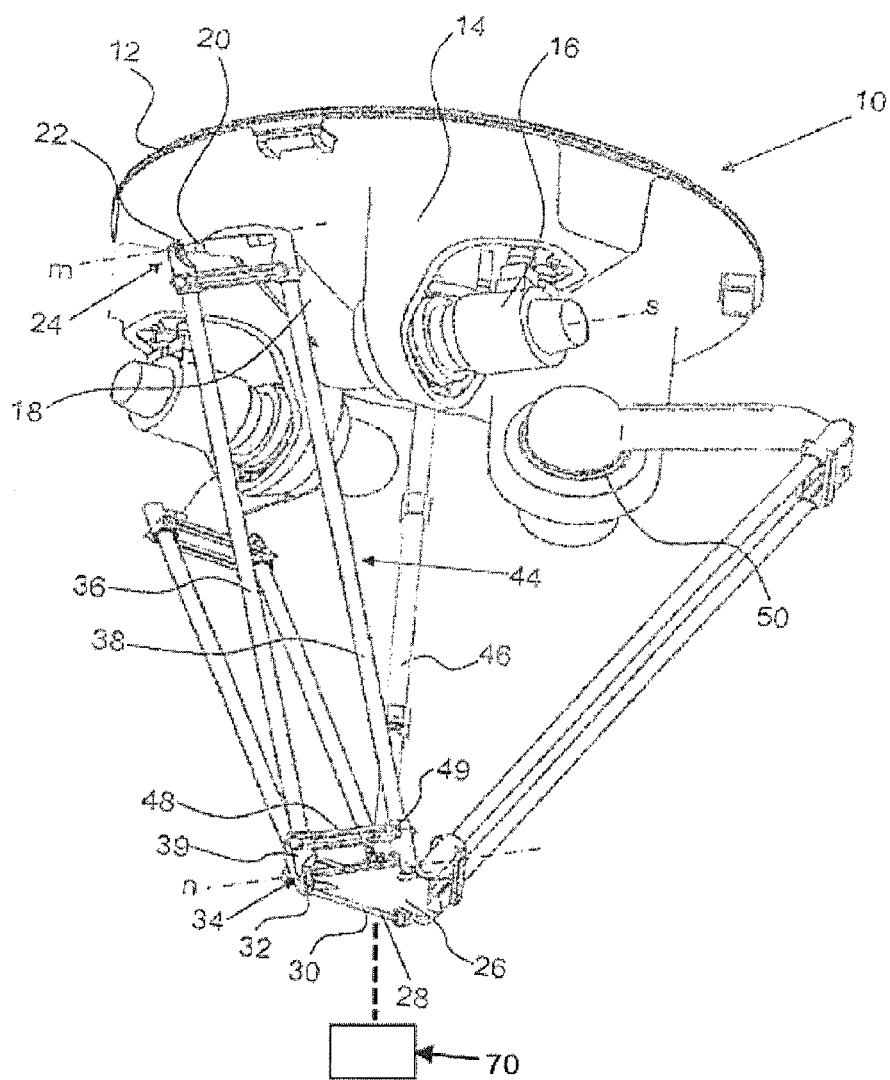
FIG. 1 is a schematic oblique view of a delta robot.

A delta robot 10 shown in FIG. 1 has a base element 12 with a horizontal mounting plane and three mounts 14 protruding from the base element 12, each for accommodating a respective motor/transmission unit 16. Each motor/transmission unit 16 has a transmission shaft that defines a transmission axis s and supports an actuating arm 18 that is able to pivot around the transmission axis s. The three transmission axes lie in a plane parallel to the mounting plane of the base element 12 and their intersection points constitute the vertices of an equilateral triangle. At the free end of each actuating arm 18, there is a first joint rod 20 that defines a first articulation axis m oriented parallel to the transmission axis s. Each first joint rod 20 has a first joint part 22 at each of its two ends, each belonging to a first ball joint 24. The first joint parts 22 arranged in pairs are situated mirror symmetrically to each other in relation to a vertical plane; the three vertical planes intersect at a common vertical axis, which constitutes a symmetry axis for the arrangement of the three motor/transmission units 18, and enclose an angle of 120° in relation to one another.

A support element 26 essentially embodied in the form of a plate with lateral edges 28 constituting an equilateral triangle, also referred to as the tool support or platform, is equipped at each of the three lateral edges 28 with a second joint rod 30 that defines a second articulation axis n. Each second joint rod 30 has a first joint part 32 at each of its two ends, each belonging to a respective second ball joint 34. The first joint parts 32 of each second joint rod 30 are arranged in pairs and situated mirror symmetrically to each other in relation to an angle bisector of the equilateral triangle that characterizes the support element 26. Support element 26 is provided for arranging at least one gripping mechanism 70 for gripping an object.

The distance between the first joint parts 22 at the free end of each actuating arm 18 is identical to the distance between the first joint parts 32 at the lateral edges 28 of the support element 26.

Each actuating arm 18 is associated with a respective lateral edge 28 of the support element 26. A pair of identically embodied connecting rods 36, 38, also referred to as parallelogram rod assemblies, each have an end piece 39 at their ends, each of which is equipped with a respective second joint part 40, 42. Each second joint part 40, 42, together with a first joint part 22, 32 at the free end of the actuating arm 18 and at the lateral edge 28 of the support element 26, constitutes a corresponding first or second ball joint 24, 34.

The first joint parts 22, 32 at the free end of the actuating arm 18 and at the lateral edge 28 of the support element 26 are embodied as joint balls, the second joint parts 40, 42 on the end pieces 39 of the connecting rods 36, 38 are embodied as joint sockets.

The two equal-length connecting rods 36, 38, together with the two likewise equal-length joint rods 20, 30, constitute a parallelogram rod assembly 44, with a bail joint 24, 34 at each vertex of the parallelogram. The connection of the actuating arms 18 to the support element 26, each by means of a respective parallelogram rod arrangement 44, prevents the support element 26 from rotating around axes in all three spatial dimensions. The support element 26 is consequently only able to move parallel to itself in response to a movement of the actuating arms 18. The controlled pivoting motion of the actuating arms 18 around their transmission axes s is consequently converted into a linear motion of the support element 26.

The support element 26 is connected to the base element 12 via a telescoping, adjustable-length central shaft 46 for transmitting torques. The central shaft 46 is attached to the support element 26 by means of a universal joint. At its end oriented away from the support element 26, the central shaft 46 is connected to a drive shaft of a servomotor that is not shown in the drawing. The central shaft 46 can be used to produce a rotation of the support element 26 in three-dimensional space.

Spaced a short distance apart from the first and second ball joints 24, 34, the two connecting rods 36, 38 of each parallelogram rod assembly 44 are equipped with pairs of pins 49 protruding laterally from the end pieces 39. The connecting rods 36, 38 are connected to each other by means of two elastically stretched O-rings 48 made of rubber-elastic material that are placed around the pins 49 as prestressing elements, essentially parallel to the articulation axes m, n.

Figure 2:
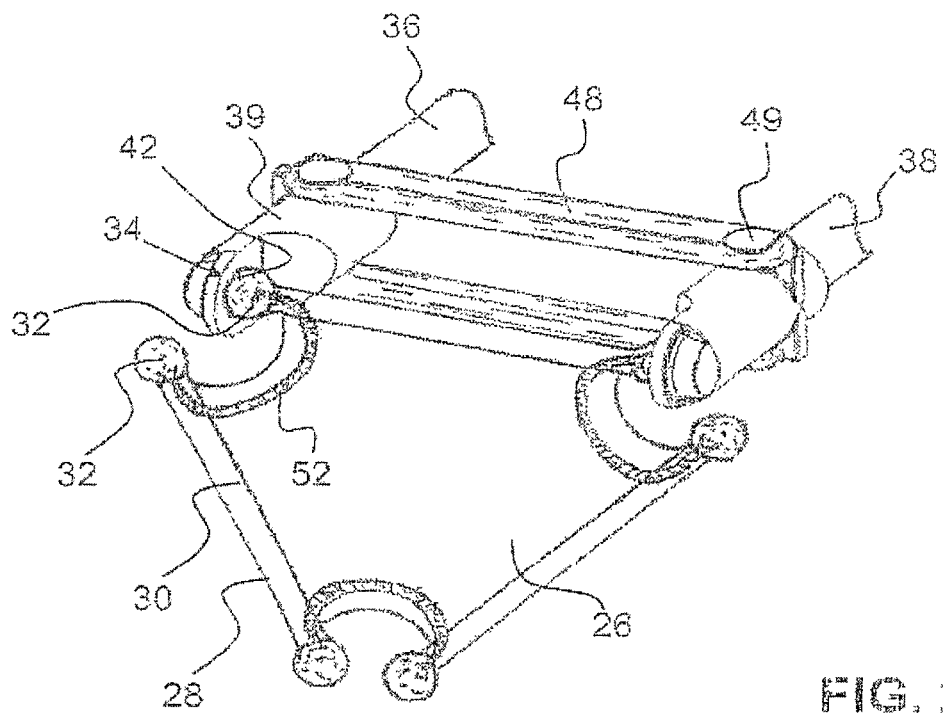
FIG. 2 is a schematic, enlarged oblique view of the connection of the support element to a parallel rod assembly of the delta robot from FIG. 1.

In FIG. 2, adjacent first joint parts 32, which are embodied in the form of joint balls composed of electrically conductive material, are connected to each other via electric conductor strips 52 on the support element 26, which is produced from an electrically insulating material. The conduction of an electrical monitoring current extends from one electrically conductive connecting rod 38 composed of carbon fiber material of a parallelogram rod assembly 44 via the electrically conductive end piece 39 composed of graphite-containing plastic to a first joint part 32 and from this, via an electric conductor strip 52 to an adjacent first joint part 32 and via the electrically conductive end piece 39 composed of graphite-containing plastic to the electrically conductive connecting rod 36 composed of carbon fiber material of the adjacent parallelogram rod assembly 44.

Figure 3:
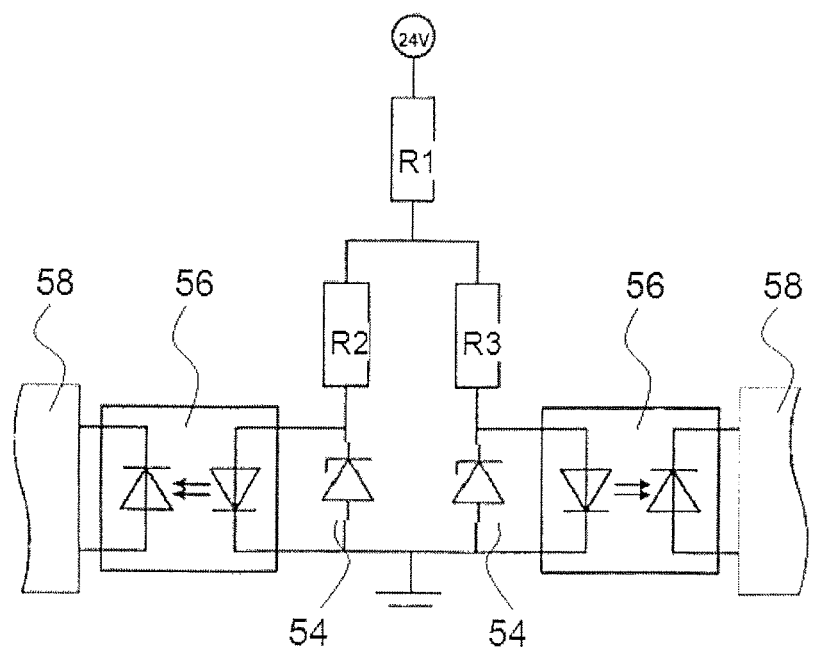
FIG. 3 is a schematically depicted equivalent circuit diagram for a wiring of the delta robot from FIG. 1.

The equivalent circuit diagram depicted in FIG. 3 shows the monitoring circuit for an arrangement with a support element composed of an electrically conductive material. A monitoring current, originated by a source voltage of 24 volts, for example, flows from a first actuating arm with the equivalent resistance R1 via the support element and back to the two other actuating arms with the equivalent resistances R2 and R3, respectively. The introduction of the monitoring current into one actuating arm occurs, for example, via a sliding ring contact 50 shown in FIG. 1. In normal conditions, the current flows from the first to the other two actuating arms and through a Zener diode 54. The generated voltage input of an opto-coupler 56 activates a digital input to a controller 58. If one or more connecting rods 36, 38 are detached, the electrical circuit to at least one of the other two actuating arms is interrupted. The lack of a current in the Zener diode 54 prevent the opto-coupler 56 from switching and, through the digital input of the controller, 58 is inactive. The lack of signal stops the movement of the robot.

The foregoing relates to the preferred exemplary embodiments of the invention, it being understood that other variants and embodiments thereof are possible within the spirit and scope of the invention, the latter being defined by the appended claims.

The invention claimed is:

1. A device for moving and positioning an object in space, comprising:
    at least three actuating arms that are each connected to a motor/transmission unit and are pivotable around a transmission axis;
    a support element provided for arranging at least one gripping mechanism for gripping the object;
    each actuating arm having, at its free end, a first articulation axis extending parallel to the transmission axis, with first joint parts spaced apart from each other, each belonging to a respective first ball joint;
    the support element having a second articulation axis associated with each actuating arm, with first joint parts spaced apart from each other, each belonging to a respective second ball joint;
    the first articulation axis being connected to the second articulation axis by a pair of connecting rods that have second joint parts at their ends and, together with the first joint parts on the first articulation axis and the first joint parts on the second articulation axis, these second joint parts at the ends of the connecting rods form the first ball joint and second ball joint, and the connecting rods are connected to each other in order to stabilize the ball joints,
    wherein the actuating arms are electrically insulated in relation to one another, and the connecting rods, the joint parts of the ball joints, and either the support element or an electrical conductor strip constitute electrically conductive or signal line-equipped components of a monitoring circuit, wherein the monitoring circuit extends from one actuating arm via the connecting rods, the joint parts of the ball joints, and the support element or the electrical conductor strip, to the two other actuating arms.

2. The device as recited in claim 1, wherein the support element is composed of an electrically conductive material.

3. The device as recited in claim 2, wherein the connecting rods are composed of aluminum, steel, or a material with integrated electrically conductive components or substances.

4. The device as recited in claim 3, wherein the first joint parts are composed of an electrically conductive base material, or of an electrically conductive ceramic material.

5. The device as recited in claim 3, wherein the second joint parts are produced out of an electrically conductive ceramic material.

6. The device as recited in claim 2, wherein the second joint parts are produced out of an electrically conductive ceramic material.

7. The device as recited in claim 2, wherein the first joint parts are composed of an electrically conductive base material, or of an electrically conductive ceramic material.

8. The device as recited in claim 1, wherein the first joint parts are composed of an electrically conductive base material, or of an electrically conductive ceramic material.

9. The device as recited in claim 1, wherein the support element is composed of an electrically non-conductive material and at least two of the adjacent joint parts of the ball joints of adjacent parallelogram rod assemblies are connected to each other via the electrical conductor strip.

10. The device as recited in claim 9, wherein the connecting rods are composed of aluminum, steel, or a material with integrated electrically conductive components or substances.

11. The device as recited in claim 10, wherein the first joint parts are composed of an electrically conductive base material, or of an electrically conductive ceramic material.

12. The device as recited in claim 10, wherein the second joint parts are produced out of an electrically conductive ceramic material.

13. The device as recited in claim 12, wherein the first joint parts are composed of an electrically conductive base material, or of an electrically conductive ceramic material.

14. The device as recited in claim 9, wherein the second joint parts are produced out of an electrically conductive ceramic material.

15. The device as recited in claim 9, wherein the first joint parts are composed of an electrically conductive base material, or of an electrically conductive ceramic material.

16. The device as recited in claim 1, wherein the connecting rods are composed of aluminum, steel, or a material with integrated electrically conductive components or substances.

17. The device as recited in claim 16, wherein the second joint parts are produced out of an electrically conductive ceramic material.

18. The device as recited in claim 16, wherein the first joint parts are composed of an electrically conductive base material, or of an electrically conductive ceramic material.

19. The device as recited in claim 1, wherein the second joint parts are produced out of an electrically conductive ceramic material.

20. The device as recited in claim 19, wherein the first joint parts are composed of an electrically conductive base material, or of an electrically conductive ceramic material.

* * * * *